United States Patent [19]

Edmonston

[11] E Re. 31,475

[45] Reissued Dec. 27, 1983

[54] CARBURETOR

[76] Inventor: William H. Edmonston, 14831 Dakota Rd., Apple Valley, Calif. 92307

[21] Appl. No.: 416,089

[22] Filed: Sep. 8, 1982

Related U.S. Patent Documents

Reissue of:

[64] Patent No.: 4,221,747
Issued: Sep. 9, 1980
Appl. No.: 928,292
Filed: Jul. 26, 1978

[51] Int. Cl.[3] ..... F02M 9/06
[52] U.S. Cl. ..... 261/44 B
[58] Field of Search ..... 261/44 C, 44 B

[56] References Cited

U.S. PATENT DOCUMENTS

| | | | |
|---|---|---|---|
| 1,072,492 | 9/1913 | Pierson | 261/DIG. 38 |
| 1,157,363 | 10/1915 | Blomquist | 261/44 B |
| 1,444,222 | 2/1923 | Trego | 261/44 B |
| 1,582,187 | 4/1926 | Morris | 261/44 B |
| 1,890,196 | 12/1932 | Schramm et al. | 261/DIG. 39 |
| 1,971,494 | 8/1934 | Lesage | 261/44 B |
| 3,168,599 | 2/1965 | Marsee et al. | 261/DIG. 39 |
| 3,182,974 | 5/1965 | Hill | 261/50 A |
| 3,275,307 | 9/1966 | Robechaud | 261/DIG. 50 |
| 3,493,217 | 2/1970 | Farley | 261/44 C |
| 3,822,058 | 7/1974 | Carter | 261/44 B |
| 3,834,679 | 9/1974 | Baribeau et al. | 261/DIG. 39 |
| 3,875,917 | 4/1975 | Scarritt, Sr. | 261/44 C |
| 3,957,930 | 5/1976 | Birmingham | 261/44 B |
| 4,013,741 | 3/1977 | Edmonston | 261/44 B |

FOREIGN PATENT DOCUMENTS

| | | | |
|---|---|---|---|
| 595128 | 4/1934 | Fed. Rep. of Germany | 261/DIG. 39 |
| 972281 | 1/1951 | France | 261/44 B |
| 11811 | of 1916 | United Kingdom | 261/44 B |
| 116232 | 6/1918 | United Kingdom | 261/44 B |
| 152442 | 10/1920 | United Kingdom | 261/44 B |
| 173599 | 1/1922 | United Kingdom | 261/44 B |
| 217447 | 6/1924 | United Kingdom | 261/44 B |
| 299191 | 10/1928 | United Kingdom | 261/44 B |
| 752339 | 7/1956 | United Kingdom | 261/44 B |
| 1151802 | 5/1969 | United Kingdom | 261/44 C |

*Primary Examiner*—Tim R. Miles
*Attorney, Agent, or Firm*—Jacobi, Siegel, Presta, Marzullo & Aronson

[57] ABSTRACT

A carburetor comprising a body defining a throat, a throttle slide member slidably mounted on the body and disposed in the throat, and a tapered metering rod or needle mounted on the slide member and extending downwardly into a fuel supply tube leading into a fuel reservoir or bowl secured to the body. The slide member has front and rear, substantially flat panels disposed in substantially parallel relation, with the front panel being shorter than the rear panel for the purpose of providing air at the outlet of the fuel supply tube even when the slide is in a closed position and for directing air toward the outlet when the slide is in an open position. The body is provided with a substantially axial groove intersecting the fuel outlet at the throat for the purpose of directing high speed air flow toward the metering rod and over the fuel outlet when the slide is opened. The metering rod is provided with a downwardly and inwardly tapered, rear flat face and is mounted for longitudinal adjustment relative to the slide member.

16 Claims, 11 Drawing Figures

CARBURETOR

Matter enclosed in heavy brackets [ ] appears in the original patent but forms no part of this reissue specification; matter printed in italics indicates the additions made by reissue.

BACKGROUND OF THE INVENTION

The present invention relates to a carburetor construction and, more particularly, to a carburetor of the slide and metering rod type which is generally like those disclosed in my prior U.S. Pat. Nos. 3,985,839 and 4,013,741. The carburetor of the present invention is constructed to maximize the flow of air in the vicinity of the metering rod and fuel outlet to assure thorough atomization and distribution of the fuel in the airstream before it reaches the combustion chamber, thereby minimizing the possibility of fuel droplets leaving the airstream and condensing on the wall of the fuel passage.

Although previously used and disclosed carburetors of the slide and metering rod type have generally served the purpose, these carburetors have been subject to one or more of the following disadvantages:

(1) Insufficient atomization and distribution of the fuel in the airstream;

(2) Insufficient flow of air in the vicinity of the fuel outlet and metering rod;

(3) Insufficient choke arrangement;

(4) Poor design of metering rod or needle;

(5) Difficulty in mounting and adjustment of metering rod or needle; and/or (6) Turbulent and inconsistent fuel flow when vehicle is subjected to rough terrain.

Accordingly, it will be readily seen that a need has arisen for a new and improved carburetor of the slide and metering rod type which is not subject to any of the above-mentioned disadvantages. The carburetor of the present invention fills this need and possesses certain improvements and advantages which are not embodied in the prior art carburetors of this type.

SUMMARY OF THE INVENTION

The carburetor of the present invention generally comprises a body defining a throat, a throttle slide member slidably mounted on the body and disposed in the throat, and a tapered metering rod or needle mounted on the slide member and extending downwardly into a fuel supply tube leading into a fuel reservoir or bowl secured to the body. The slide member has front and rear, substantially flat panels disposed in substantially parallel relation, with the front panel being shorter than the rear panel for the purpose of providing air at the outlet of the fuel supply tube even when the slide is in a closed position and for directing air toward the outlet when the slide is in an open position. The body is provided with a substantially axial groove intersecting the fuel outlet at the throat for the purpose of directing high speed air flow toward the metering rod and over the fuel outlet when the slide is opened. The metering rod is provided with a downwardly and inwardly tapered, rear flat face and is mounted for longitudinal adjustment relative to the slide member.

The metering rod may be provided with a plurality of holes therethrough for the purpose of providing more direct air flow at the fuel outlet and better atomization of the fuel. Also, the metering rod may be provided with various tapered configurations for different operating characteristics, such as a straight portion near its lower end and a more radically tapered portion near its upper end for the purpose of providing a more rapid flow of fuel for mid-range operation.

In a further embodiment of the carburetor of the present invention, the outer faces of the slide member panels may be recessed for the purpose of reducing sliding friction, aiding in removal of dirt or other foreign matter from the rim portion thereof and, in the case of the front panel, aiding in directing incoming air downwardly toward the metering rod and fuel outlet.

For the purpose of preventing turbulence in the fuel reservoir or bowl and insuring a constant fuel flow even when the vehicle is subjected to rough terrain, the lower end of the fuel supply tube is provided with an enlarged downwardly opening flange or "umbrella" portion disposed near the lower end of the fuel reservoir. The flange serves to trap fuel and prevent turbulence therein, and is provided with an upwardly and inwardly tapered inner surface for the purpose of directing fuel upwardly into the fuel supply tube to further reduce turbulence.

DESCRIPTION OF THE PREFERRED EMBODIMENTS

Figure 1:
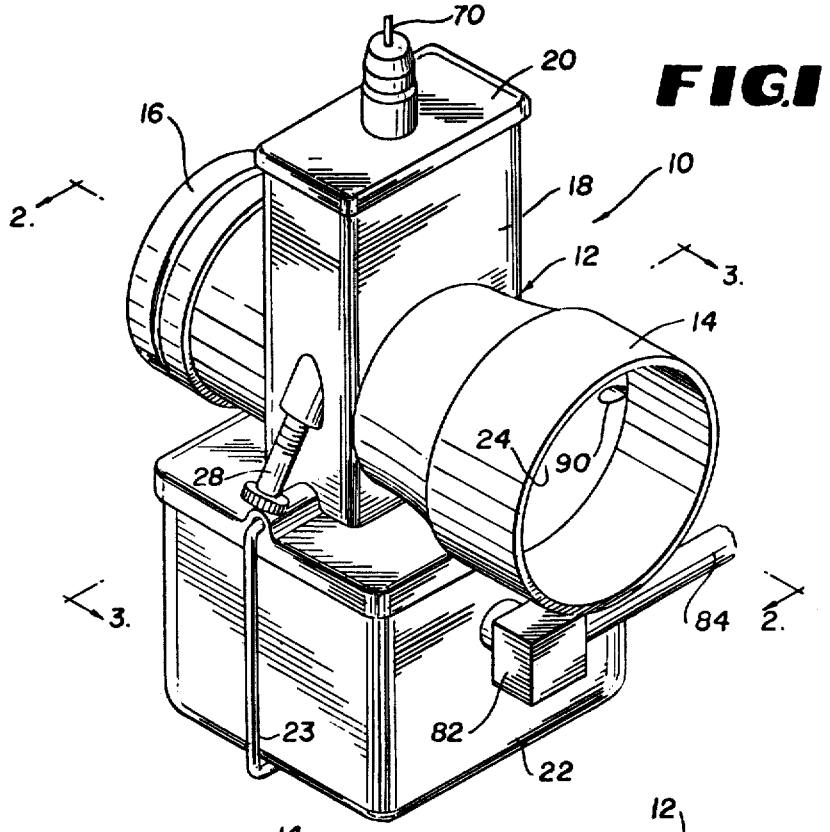
FIG. 1 is a perspective view of a carburetor constructed in accordance with the principles of the present invention.

Referring to FIGS. 1 through 4, the carburetor 10 of the present invention generally comprises a body 12 having an air inlet end 14, an air outlet end 16 and a centrally located slide supporting portion 18; a cover 20 adapted to fit over the upper portion of the slide supporting portion 18; and a fuel reservoir or bowl 22 secured to the underside of the body beneath the slide supporting portion 18. Preferably, the inlet end 14, outlet end 16 and slide supporting portion 18 are formed of unitary construction, and a throat 24 extends through the body from one end to the other. The cover 20 and reservoir 22 may be removably secured to the body 12 in any suitable manner, such as by flexible and resilient spring members 21 and 23, respectively.

Figure 4:
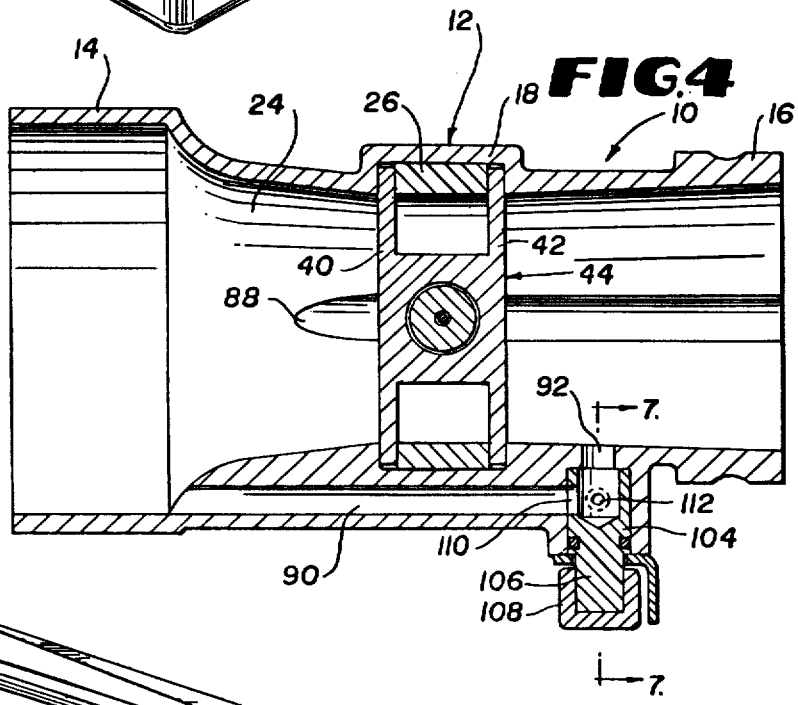
FIG. 4 is a sectional view taken substantially along line 4—4 of FIG. 2.
Figure 3:
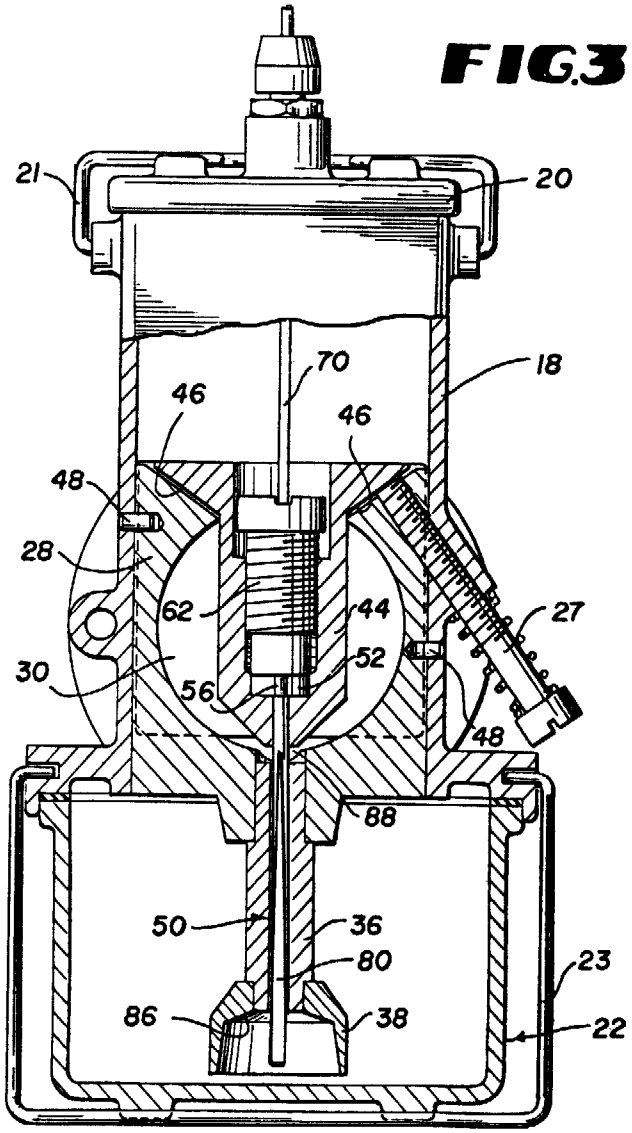
FIG. 3 is an enlarged sectional view taken substantially along line 3—3 of FIG. 1.
Figure 6:
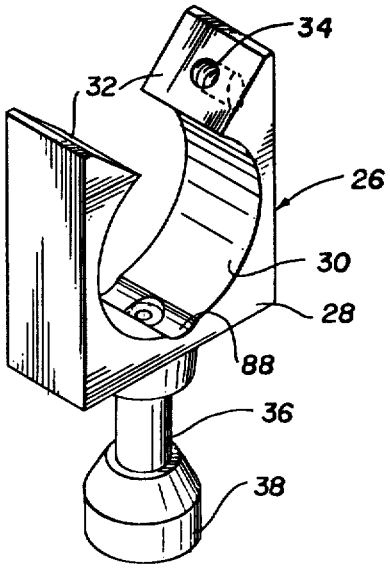
FIG. 6 is a perspective view of one embodiment of a throat insert and fuel supply tube for the carburetor of the present invention.

As specifically shown in FIGS. 3, 4 and 6, the body 12 is provided with an insert 26 fixedly mounted by a locking screw 27 within the slide supporting portion 18. The insert 26 comprises an upper portion 28 having an aperture 30 therethrough that corresponds in size and shape to the adjacent portions of the throat 24 in the body 12. The upper end of the upper insert portion 28 is open and comprises oblique end faces 32, one of which has a threaded aperture 34 extending therethrough which is adapted to receive the locking screw 27. A fuel supply tube 36 is secured to the bottom of the upper portion 28 and extends through an aperture therein into communication with the aperture 30. The fuel supply tube 36 extends downwardly into the fuel reservoir or bowl 22 and is provided at its lower end with an outwardly and downwardly extending flange or "umbrella" portion 38 disposed near the lower end of the bowl 22 for a purpose to be more fully described hereinafter.

As shown in FIG. 4, the insert 26 is narrower than the adjacent portions of the slide supporting portion 18 so as to define grooves on each side of the slide supporting portion that are adapted to slidably receive the side edge portions of the front and rear panels 40 and 42 of a throttle slide member 44 mounted within the slide supporting portion 18 for substantially vertical slidable movement therein. At its upper portion, the slide member 44 is provided with a pair of downwardly facing oblique surfaces 46 which are adapted to engage the complementary oblique faces 32 on the upper end of the insert 26 for the purpose of limiting the downward movement of the slide member 44 within the slide supporting portion 18 of the body 12. As specifically shown in FIG. 3, the locking screw 27 can be adjusted to engage one of the oblique surfaces 46 on the slide member 44 for the purpose of adjusting the lowest position of the slide member. In addition to the locking screw 27, the insert 26 may be retained within the slide supporting portion 18 by locking pins 48.

A fuel metering rod or needle 50 is adjustably secured to and extends downwardly from the slide member 44, through the fuel supply tube 36 and into the flange portion 38 thereof disposed near the bottom of the reservoir or bowl 22. The metering rod 50 is provided with an enlarged head portion 52 at its upper end which is slidably received within an internal bore 54 within the slide member 44. The head portion 52 is provided with a key portion 56 that is receivable within a complementary groove 58 in the slide member bore 54 for the purpose of maintaining the metering rod 50 in a desired orientation which will be more fully described hereinafter. A coil spring 60 or other biasing means is provided between the bottom of the slide member bore 54 and the lower surface of the head portion 52 of the metering rod 50 and serves to urge the head portion 52 upwardly away from the lower end of the bore 54, as specifically shown in FIG. 2.

An adjusting screw 62 is threadably mounted within an upper threaded portion of the slide member bore 54 and has a lower end in engagement with the upper surface of the enlarged head portion 52 of the metering rod 50. The adjusting screw 62 is provided with a lower internal bore 64 and an upper internal bore 66 which are separated by an intermediate flange portion 68 having an aperture therethrough extending between the lower bore 64 and the upper bore 66. A control cable 70 for the throttle slide member 44 extends through the upper bore 66 in the adjusting screw 62 and through the aperture in the intermediate flange 68. The control cable 70 is provided with an enlarged head portion 72 at its lower end which is disposed within the lower bore 64 in the adjusting screw 62 and is in engagement with the intermediate flange 68 for the purpose of connecting the cable 70 to the adjusting screw 62 and to the throttle slide member 44. A helical spring 74 surrounds the cable 70 and extends from the lower end of the upper bore 66 and the adjusting screw 62 to the upper end of the slide supporting portion 18. At its upper end, the helical spring 74 surrounds the lower end of a tube 76 extending downwardly from and threadably secured in an aperture in the cover 20 for the slide supporting portion 18. The cable 70 extends through the tube 76 and the cap member 20 for connection to any suitable type of manual control means disposed on the vehicle in which the carburetor is mounted. The helical spring 74 serves to urge the slide member 44 to the closed or down position shown in FIGS. 2 and 3 wherein it cuts off air flow through the throat 24 of the body 12. Upward movement of the cable 70 serves to move the slide member 44 upwardly against the force of the spring 74 to allow air flow through the throat 24 and upward movement of fuel from the reservoir 22 through the fuel supply tube 36 in a manner to be described more fully hereinafter.

The vertical position of the metering rod or needle 50 relative to the slide member 44 may be easily adjusted by rotation of the adjusting screw 62 which is provided at its upper end with a transverse recess 78 or the like for receiving the head of a screwdriver or similar tool. Rotation of the adjusting screw 62 serves to move the head portion 52 of the metering rod 50 upwardly or downwardly within the lower portion of the bore 54 in the throttle slide member 44.

Figure 5:
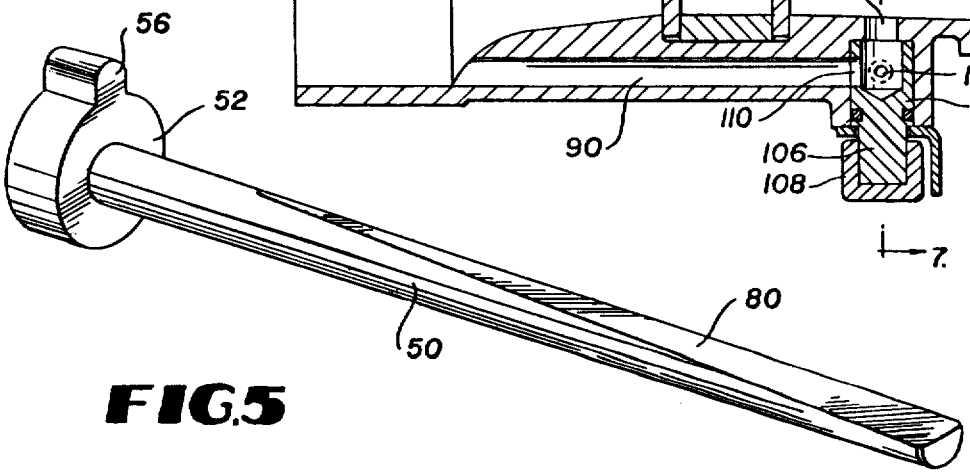
FIG. 5 is an enlarged perspective view of one embodiment of a metering rod or needle for the carburetor of the present invention.
Figure 2:
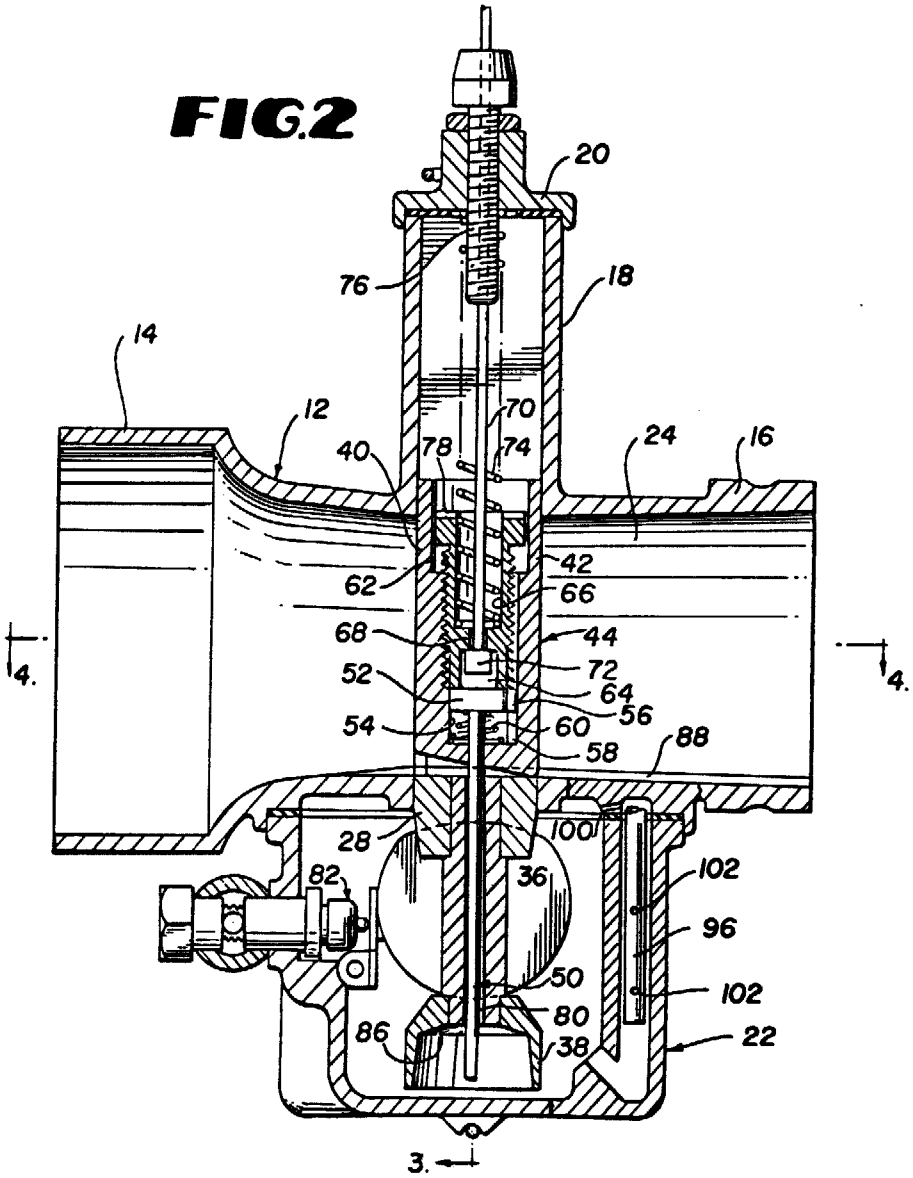
FIG. 2 is an enlarged sectional view taken substantially along line 2—2 in FIG. 1.
Figure 7:
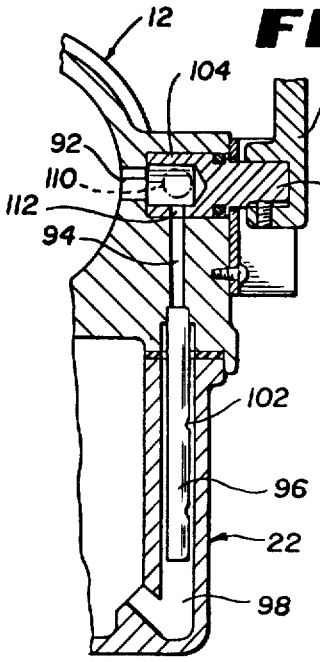
FIG. 7 is an enlarged sectional view taken substantially along line 7—7 in FIG. 4.

In one embodiment of the present invention shown in FIGS. 2, 3 and 5, the metering rod or needle 50 is provided with a downwardly and inwardly tapered flat portion 80 extending from the upper portion to the lower end thereof. The key portion 56 is so located on the enlarged head portion 52 of the metering rod 50 that the flat portion 80 faces the outlet end 16 of the carburetor body 12 when the metering rod 50 is mounted within the throttle slide member 44, as specifically shown in FIG. 2. It will be readily seen, therefore, that upper movement of the slide member 44 and corresponding upward movement of the metering rod 50 within the fuel supply tube 36 will cause a gradually larger opening at the outlet of the fuel supply tube for the supply of fuel from the fuel reservoir or bowl 22 to the carburetor throat 24, owing to the tapered flat portion 80 on the metering rod. By varying the taper of the flat portion 80 on the metering rod 50, the variation in fuel flow for a given upward movement of the slide member 44 and metering rod 50 may be adjusted.

As shown in FIGS. 2 and 4, the inner surface of the carburetor body 12 is tapered inwardly from the inlet end 14 to the slide supporting portion 18 and is tapered outwardly from the slide supporting portion 18 to the outlet end 16, thereby creating a Venturi effect when air flows through the carburetor throat from the inlet to the outlet end. This air flow past the metering rod 50 and outlet end of the fuel supply tube 36 serves to create a vacuum at the outlet of the fuel supply tube, thereby causing a flow of fuel from the fuel reservoir or bowl 22 upwardly through the opening in the fuel supply tube defined by the metering rod 50 and into the carburetor throat 24 where the fuel is mixed with incoming air and moves toward the outlet end therewith. The fuel flows upwardly from the fuel reservoir 22 into the fuel supply tube 36 because the reservoir 22 is vented to the atmosphere in a manner to be more fully described hereinafter.

The fuel reservoir bowl 22 is provided with a suitable float valve assembly 82 or any other suitable means for maintaining a minimum quantity of fuel in the reservoir. The float valve assembly 82 is connected to a fuel supply tube 84 in any suitable manner.

The downwardly extending flange portion 38 on the lower end of the fuel supply tube 36 serves to trap fuel within it and to keep air from entering the fuel supply tube when the carburetor is subjected to vibration owing to travel of the vehicle over rough terrain or the like. By trapping fuel within it, the flange portion 38 also serves to reduce turbulence in the fuel entering the lower end of the fuel supply tube. A smooth supply of fuel to the lower end of the fuel supply tube 36 is further enhanced by the upwardly and inwardly tapered inner surfaces 86 of the flange portion 38 which lead to the lower end of the fuel supply tube.

It will be appreciated that upward and downward movement of the throttle slide member 44, as actuated by the control cable 70, serves to control the air flow from the inlet end to the outlet end of the carburetor body 12 and also serves to control the flow of fuel from the fuel reservoir or bowl 22 to the carburetor throat 24 because of corresponding upward or downward movement of the metering rod 50 secured to the throttle slide member 44. A significant feature of the present invention is to maximize air flow past the metering rod and upper outlet end of the fuel supply tube 36 to assure thorough atomization and distribution of the fuel in the airstream before it reaches the combustion chamber. This is accomplished by providing the throttle slide member 44 with a lower end that is tapered downwardly from the front panel 40 to the rear thereof, as shown in FIG. 2. In other words, the front panel 40 is shorter than the rear panel 42 so that, when the throttle slide member is in the closed position shown in FIG. 2, the metering rod 50 and outlet end of the fuel supply tube 36 are exposed to air from the inlet end 14 of the carburetor body 12. In this manner, when the throttle slide member 44 is moved upwardly to open the carburetor throat 24, air is already present at the outlet of the fuel supply tube 36 to effect immediate mixing with the fuel drawn upwardly through the fuel supply tube, thereby insuring thorough atomization of the fuel. In addition, the tapering of the lower end of the throttle slide member 44 serves to direct or "tunnel" air flow downwardly toward the metering rod 50 and outlet of the fuel supply tube 36 to further enhance air flow and mixing with the fuel at this point.

Air flow across the outlet end of the fuel supply tube 36 and atomization of the fuel entering the carburetor throat at this point is further enhanced by the provision of a longitudinally extending groove 88 in the inner surface of the carburetor body 12 which intersects the metering rod 50 and outlet of the fuel supply tube 36 and extends from the inlet side of the throttle slide member to the outlet side thereof. As shown in FIG. 6, the groove 88 extends through the upper portion 28 of the insert 26 disposed within the slide supporting portion 18 of the carburetor body 12. The groove 88 serves to direct air flow and to concentrate it at the metering rod 50 and outlet of the fuel supply tube 36, thereby further enhancing atomization and distribution of the fuel in the airstream before it reaches the combustion chamber.

Figure 9:
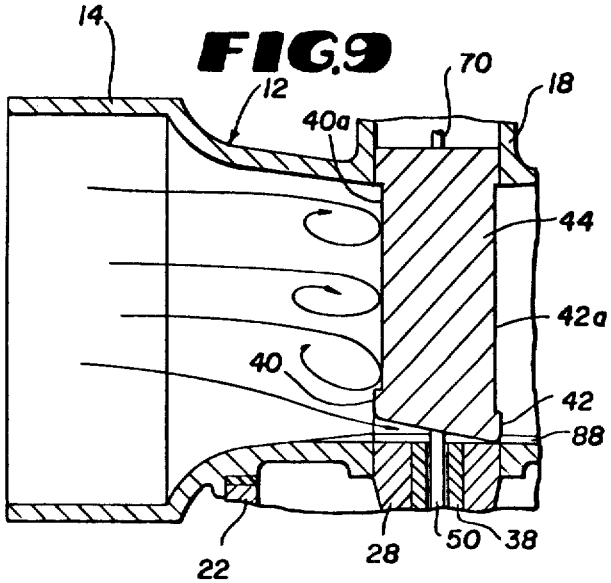
FIG. 9 is a partial side elevational view of the carburetor of the present invention, showing the modified slide member of FIG. 8.
Figure 8:
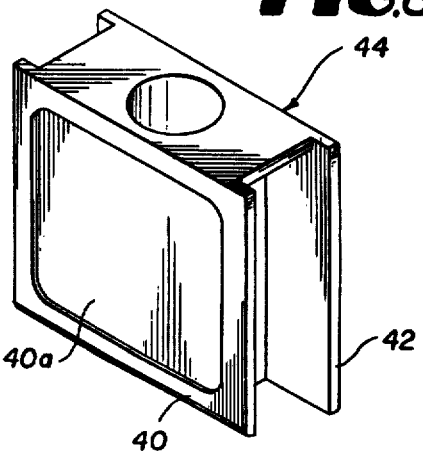
FIG. 8 is an enlarged perspective view of a modified form of the throttle slide member of the carburetor of the present invention.

In a modification of the present invention, as shown in FIGS. 8 and 9, the central portions 40a and 42a of the front and rear panels 40 and 42, respectively, of the throttle slide member 44 are recessed to reduce sliding friction between these panels and the adjacent inner surfaces of the slide supporting portion 18 of the carburetor body 12, and also to facilitate the removal of dirt or other foreign matter from the areas between front and rear panels of the slide member 44 and the surrounding portions of the slide supporting portion 18.

As specifically shown in FIG. 9, the recessed area 40a of the front panel 40 of the throttle slide member 44 aids in directing air flow downwardly toward the lower tapered portion of the slide member, the metering rod 50 and the outlet of the fuel supply tube 38. This is accomplished because incoming air tends to be locked in the pocket formed by the recessed area 40a on the front panel 40, in the manner shown by the lead lines and arrows in FIG. 9, thereby directing the following air downwardly toward the metering rod 50 and the outlet of the fuel supply tube.

Figure 10:
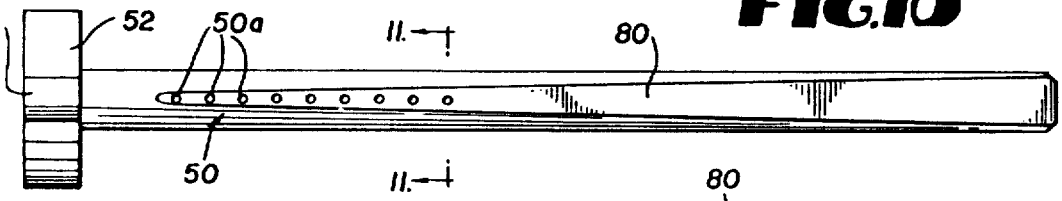
FIG. 10 is a rear elevational view of a modified metering rod or needle for use in the carburetor of the present invention.
Figure 11:
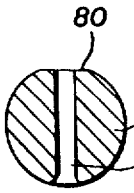
FIG. 11 is an enlarged sectional view taken substantially along line 11—11 of FIG. 10.

FIGS. 10 and 11 illustrate another embodiment of the metering rod 50 wherein a plurality of vertically spaced, transverse bores 50a extend rearwardly from the front surface thereof to the rear flat surface 80 thereof. The bores 50a serve to further maximize direct air flow over the outlet of the fuel supply tube 38 to further enhance fuel atomization and distribution. By reducing air displacement around the metering rod 50, the bores 50a create more direct air flow for efficient mixing with the fuel at the entry point into the carburetor throat.

The carburetor of the present invention also includes an improved choke arrangement which allows extra fuel to be atomized and to enter the carburetor throat when desired. As shown in FIGS. 1, 2, 4 and 7, the carburetor body 12 is provided with a longitudinal bore 90 extending from the inlet end 14 thereof to a point rearwardly of the slide support portion 18. The longitudinal bore 90 intersects with a transverse bore 92 extending into the carburetor throat 24 at the outlet portion of the carburetor body 12 and also intersects with a fuel supply bore 94 extending downwardly to the lower portion of the carburetor body 12. A choke fuel supply tube 96 is secured at its upper end to the carburetor body 12 in communication with the bore 94 and extends downwardly into a choke fuel supply bore 98 in the fuel reservoir or bowl 22. The upper end of the fuel supply bore 98 is vented to the atmosphere in any suitable manner (not shown) and an aperture 100 (see FIG. 2) is provided in a lower portion of the carburetor body 12 for the purpose of conveying atmospheric pressure from the bore 98 to the upper end of the reservoir or bowl 22. The fuel supply tube 96 is provided with one or more vent openings 102 for the purpose of enhancing upward flow of fuel from the reservoir 22 into the choke fuel supply bore 98 and through the choke fuel supply tube 96.

At the intersection of the bores 90, 92 and 94, a cylindrical valve member 104 is rotatably mounted within the carburetor body 12. The valve member 104 has a stem portion 106 extending outwardly of the carburetor body 12 and secured in any suitable manner to an actuating member 108 of any suitable type. The cylindrical valve member 104 is provided with a large opening 110 and a small opening 112 in the wall thereof which are spaced apart by an angle of 90 degrees so that when the valve member is rotated to the open position shown in FIGS. 4 and 7, the large opening 110 is in communication with the air supply bore 90 and the small opening 112 is in communication with the fuel supply bore 94, thereby supplying an auxiliary air and fuel mixture to the carburetor throat through the valve member 104 and transverse bore 92. The choke will be inoperative when the choke valve member 104 is rotated to a position other than that shown in FIGS. 4 and 7 so as to cut off communication between the air supply bore 90 and the fuel supply bore 94.

What is claimed is:

1. A carburetor, comprising:

a body having an inlet end, an outlet end, and a throat extending therethrough from said inlet end to said outlet end, a fuel supply tube secured to the underside of said body and having an outlet in communication with said throat, a throttle slide member movably mounted on the body intermediate said inlet and outlet ends thereof for substantially transverse movement across said throat to vary the unblocked portion thereof, and a metering rod secured to said throttle slide member and extending downwardly into said fuel supply tube to control the flow of fuel therethrough, said throttle slide member comprising a substantially vertical bore therethrough and means for adjusting the position of said metering rod in a substantially longitudinal direction, said metering rod comprising a head portion at the upper end thereof, said head portion being slidable within said bore, spring means being disposed between said head portion and the bottom of said bore, and said adjusting means comprising an adjusting member movably mounted on said throttle member and disposed in the portion of said bore above said head portion of said metering rod, said adjusting member having a lower end in engagement with said head portion, whereby movement of said adjusting member in said bore effects movement of said metering rod in a substantially longitudinal direction.

2. The carburetor of claim 1 wherein said metering rod has a downwardly and inwardly tapered, substantially flat portion on the outlet side thereof.

3. The carburetor of claim 1 wherein said body further comprises a substantially longitudinal choke air supply bore extending from said inlet end thereof to a point rearwardly of said throttle slide member, a choke fuel supply bore intersecting said air supply bore, a choke transverse bore leading into said throat at the outlet side of said throttle slide member and intersecting said choke fuel supply and air supply bores, and a choke valve member movably mounted within said body at the intersection of said choke fuel supply bore, said choke air supply bore and said transverse bore, said choke valve member serving to selectively connect said choke fuel supply and air supply bores with said transverse bore to provide an auxiliary air and fuel mixture to said throat at the outlet side of said throttle slide member.

4. The carburetor of claim 1 wherein the inner surface of said body has a groove extending substantially longitudinally therethrough from the inlet side of said throttle slide member to the outlet side thereof, said groove intersecting said metering rod and fuel supply tube outlet and serving to direct airflow through said throat to said metering rod and said fuel supply tube outlet to effect thorough atomization and distribution of fuel entering said throat from said fuel supply tube.

5. The carburetor of claim 1, further comprising a fuel reservoir secured to and disposed beneath said body intermediate said inlet and outlet ends, said fuel supply tube extending downwardly into said fuel reservoir.

6. The carburetor of claim 5 wherein the lower end of said fuel supply tube has a downwardly and outwardly extending flange portion disposed near the bottom of said fuel reservoir, said flange portion serving to trap fuel within it to reduce turbulence in the fuel and to prevent air from entering said fuel supply tube.

7. A carburetor, comprising:

a body having an inlet end, an outlet end, and a throat extending therethrough from said inlet end to said outlet end, a fuel supply tube secured to the underside of said body and having an outlet in communication with said throat, a throttle slide member movably mounted on the body intermediate said inlet and outlet ends thereof for substantially transverse movement across said throat to vary the unblocked portion thereof, and a metering rod secured to said throttle slide member and extending downwardly into said fuel supply tube to control the flow of fuel therethrough, the lower end of said throttle slide member being tapered downwardly from the inlet side to the outlet side thereof to direct airflow through said throat downwardly to said metering rod and said fuel supply tube outlet, said throttle slide member comprising front and rear substantially flat panels disposed in substantially parallel relation, said front panel being shorter than said rear panel at the lower end of said throttle slide member, said lower end of said slide member being tapered downwardly from the bottom of said front panel to the bottom of said rear panel, whereby when said throttle slide member is in a position to close said throat, said rear panel extends completely across said throat and the bottom of said front panel is spaced from the adjacent portion of said body to open a portion of said throat from said fuel supply tube outlet to the inlet end of said body, the central portion of the outer surface of said front panel and said rear panel being recessed.

8. The carburetor of claim 7 wherein the inner surface of said body has a groove extending substantially longitudinally therethrough from the inlet side of said throttle slide member to the outlet side thereof, said groove intersecting said metering rod and fuel supply tube outlet and serving to direct airflow through said throat to said metering rod and said fuel supply tube outlet to effect thorough atomization and distribution of fuel entering said throat from said fuel supply tube.

9. A carburetor, comprising:

a body having an inlet end, an outlet end, and a throat extending therethrough from said inlet end to said outlet end, a fuel supply tube secured to the underside of said body and having an outlet in communication with said throat, a throttle slide member movably mounted on the body intermediate said inlet and outlet ends thereof for substantially transverse movement across said throat to vary the unblocked portion thereof, and a metering rod secured to said throttle slide member and extending downwardly into said fuel supply tube to control the flow of fuel therethrough, said metering rod comprising a plurality of transverse bores extending therethrough to create more direct airflow over said fuel supply tube outlet, said metering rod having a downwardly and inwardly tapered, substantially flat portion on the outlet side thereof.

10. The carburetor of claim 9 wherein the inner surface of said body has a groove extending substantially longitudinally therethrough from the inlet side of said throttle slide member to the outlet side thereof, said groove intersecting said metering rod and fuel supply tube outlet and serving to direct airflow through said throat to said metering rod and said fuel supply tube outlet to effect thorough atomization and distribution of fuel entering said throat from said fuel supply tube.

*11. A carburetor, comprising:*

*a body having an inlet end, an outlet end, an intermediate slide supporting portion, and a throat extending therethrough from said inlet end to said outlet end;*

*an insert fixedly mounted within said slide supporting portion, said insert comprising an upper portion having an aperture therethrough that corresponds substantially in size and shape to the adjacent portions of said throat, the upper end of said upper insert portion being open and comprising an end face;*

*a fuel supply tube secured to the bottom of said upper insert portion and having an outlet at its upper end in communication with said insert aperture and said throat;*

*a throttle slide member movably mounted within said slide supporting portion for substantially transverse movement across said insert aperture and said throat to vary the open portion thereof, said throttle slide member being movable through said open upper end of said upper insert portion and being engageable with said end face of said open upper end of said upper insert portion to limit the transverse movement of said throttle slide member; and*

*a metering rod secured to said throttle slide member and extending downwardly into said fuel supply tube to control the flow of fuel therethrough.*

*12. The carburetor of claim 11 wherein said insert is narrower than the adjacent portions of said slide supporting portion so as to define spaces therebetween that are adapted to receive portions of said throttle slide member therein.*

*13. The carburetor of claim 12 wherein said spaces are grooves on each side of said slide supporting portion, and said throttle slide member comprises front and rear substantially flat panels having side edge portions that are slidably disposed within said grooves.*

*14. The carburetor of claim 13 wherein said front and rear panels are disposed in substantially parallel relation.*

*15. The carburetor of claim 14 wherein the upper portion of said insert comprises front and rear substantially flat faces disposed in substantially parallel relation.*

*16. The carburetor of claim 11 wherein the upper end of said upper insert portion comprises a pair of end faces that are engageable with said throttle slide member.*

* * * * *